(12) United States Patent
Howe

(10) Patent No.: US 6,780,310 B1
(45) Date of Patent: Aug. 24, 2004

(54) VARIABLE VORTEX BAFFLE FLUID FILTER

(76) Inventor: Glenn B. Howe, 3961 Via Marisol, #204, Los Angeles, CA (US) 90042

( * ) Notice: Subject to any disclaimer, the term of this patent is extended or adjusted under 35 U.S.C. 154(b) by 166 days.

(21) Appl. No.: 10/277,241

(22) Filed: Oct. 21, 2002

(51) Int. Cl.[7] ............. B01D 21/26; B01D 17/025; B01D 29/11; C02F 1/00; E03F 1/00
(52) U.S. Cl. ............. 210/155; 210/170; 210/261; 210/295; 210/304
(58) Field of Search ............. 210/155, 170, 210/261, 295, 304, 336, 512.1, 526

(56) References Cited

U.S. PATENT DOCUMENTS

| | | | | |
|---|---|---|---|---|
| 5,575,909 A | * | 11/1996 | Foster | ............. 210/304 |
| 6,241,881 B1 | * | 6/2001 | Pezzaniti | ............. 210/170 |
| 6,419,843 B1 | * | 7/2002 | Natarius | ............. 210/304 |

* cited by examiner

*Primary Examiner*—David A. Reifsnyder
(74) *Attorney, Agent, or Firm*—Monty Koslover

(57) ABSTRACT

A variable vortex, baffle fluid filter apparatus for installation primarily in urban storm water drain sumps. A circular, filter channel that is enclosed on all four sides by filter screens, includes a cylindrical baffle screen that is attached concentrically below the channel for moving impurities to the sump bottom. Provision is made for manually adjusting the velocity of the fluid inlet flow. An angle adjustable, pivotable vane is provided in front of the inlet opening to adjust inlet flow velocity and vortex strength, to keep inlet impurities from sticking to the filter screens. The filter unit provides 150 percent more treatment capacity than comparable filter units and provides easy access for maintenance to all parts.

5 Claims, 3 Drawing Sheets

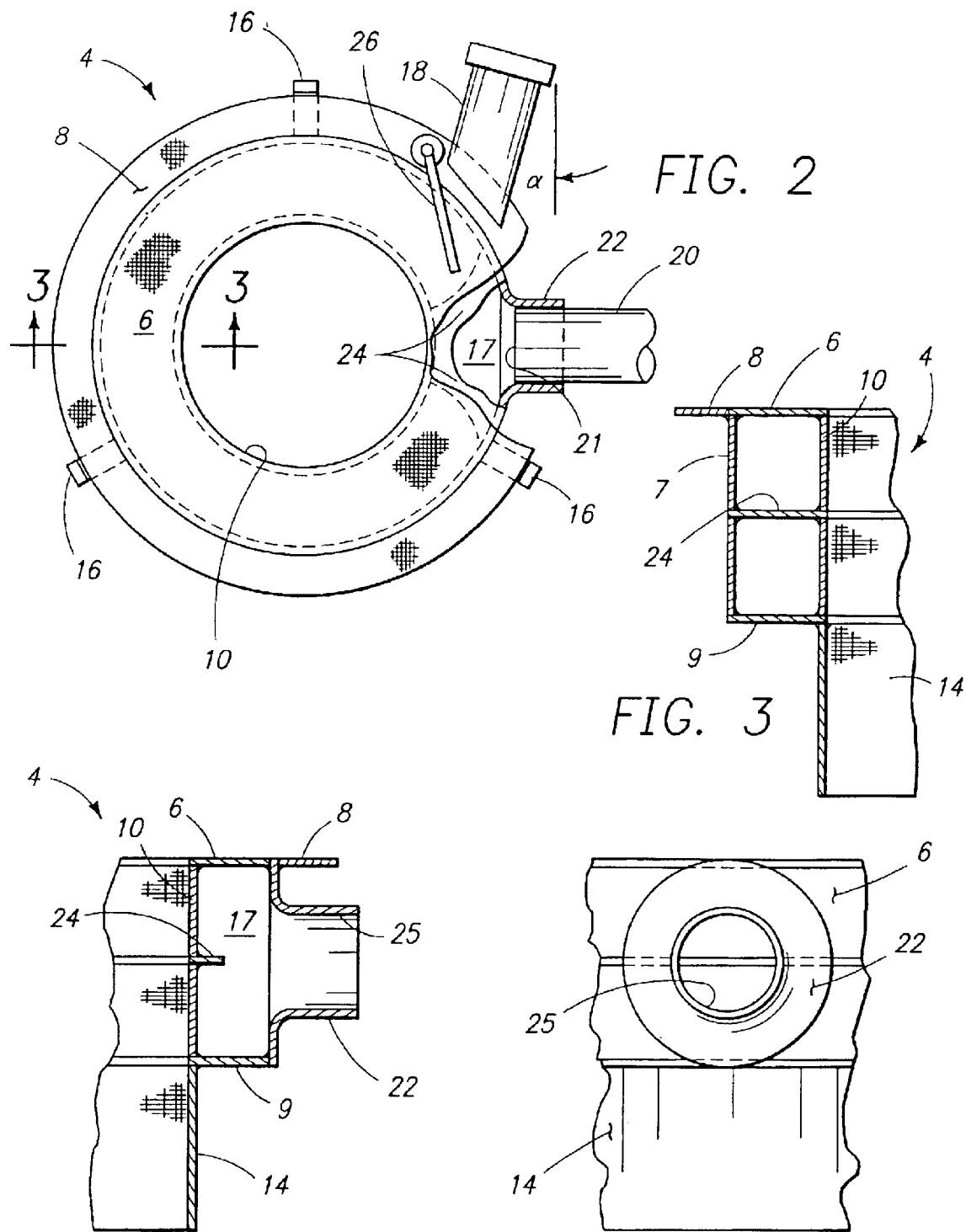

VARIABLE VORTEX BAFFLE FLUID FILTER

BACKGROUND OF THE INVENTION

1. Field of the Invention

This invention relates to apparatus for filtering polluted water or other fluids, and more particularly, to apparatus for filtering storm water run-off and the like.

2. Background

Filter apparatus has long been installed in storm water drain holding sumps in metropolitan areas. These filters are installed to separate out oil sludge and large particulate impurities that may occasionally find their way into storm water drains. The filtered oil sludge and impurities are expected to fall down to the bottom of a sump, where they can be periodically removed by a suction pipe inserted through a service opening.

Commonly installed filter apparatus employ simple screen filter arrangements that tend to clog up; leading to repeated maintenance work and possible filter replacement. To counter and alleviate these well known problems, several different vortex flow filter equipments have been developed and are available for installation. These vortex flow filters direct the inlet flow in a manner which greatly reduces the amount of filter clogging over time, and thereby reduces filter maintenance costs.

However, while the currently available vortex filter units represent improvements in current filter design, even further significant filter changes and improvements are requested by municipal agencies responsible for sewer cleaning, hoping to reduce their burgeoning maintenance and replacement costs.

Presently available vortex filter units typically employ cylindrical filter screens, with the inlet flow velocity usually being uncontrolled. In this arrangement, only one side of the cylindrical screen is available for filtering action, thus limiting the filtering capacity for any given sump installation size. For example, in treatment capacity requirements of 100 cfs or, more, which may be needed in some areas, the necessary filter installation becomes very large, and expensive. Furthermore, inlet constrictions for velocity control are often placed in pipes and difficult to access for cleaning; leading to probably expensive maintenance problems.

Thus, there remain several ongoing problem areas that afflict the typical storm drain filter in use today, resulting in much unavoidable repair and replacement costs.

The present invention incorporates a filter apparatus design that solves much of these problems and greatly reduces costs.

SUMMARY OF THE INVENTION

The invention is a variable vortex, baffle fluid filter apparatus that is intended particularly for installation in urban storm water drain sumps. The filter apparatus comprises a circular, filter channel that is enclosed on all four sides by filter screens, a cylindrical baffle screen that is attached concentrically below the channel for moving impurities to the sump bottom, and a means for manually adjusting the velocity of the fluid inlet flow. The filter channel is sized in outer diameter to fit horizontally in a holding sump, with an attached peripheral rim screen filling any space between the channel side and the sump wall. Provision is made for fastening the channel to the sump wall immediately below the inlet pipe opening which is angled so that incoming flow impinges tangentially on the top surface of the filter channel, starting a vortex flow. An adjustable position, pivotable vane is provided in front of the inlet opening to adjust inlet flow velocity and further direct vortex flow. This ensures that the vortex strength is sufficient to concentrate impurity particles at the center of the filter channel opening where they can fall to the bottom of the sump for later removal.

Accordingly, it is a prime object of this invention to provide a filter apparatus which includes means for greatly reducing normal filter clogging by incoming impurities.

Another object is to provide a filter apparatus for storm water drains that increases the available filter area by at least fifty percent for a given filter size, thus reducing filter installation size for any required capacity.

An advantage of the present invention over presently available vortex filter units is its lower installation cost for a given treatment capacity.

Further objects and advantages of the invention will be apparent from studying the following portion of the specification, the claims and the attached drawings.

BRIEF DESCRIPTION OF THE DRAWINGS

FIG. 2 is a top view of the fluid filter apparatus, particularly showing the inlet end pipe insertion angle into the sump, and the outlet flow area from the filter channel into the outlet end pipe;

FIG. 3 is a cross-section view of the filter channel and attached baffle screen taken along line 3—3 of FIG. 2;

FIGS. 4A and 4B are respectively, a cross-section view of the filter apparatus taken at the filtered fluid outlet connection, and a partial side view, looking directly at the filtered fluid outlet.

DESCRIPTION OF THE PREFERRED AND ALTERNATE EMBODIMENTS

The invention is a variable vortex, baffle fluid filter apparatus that is intended primarily for use in storm water drain sumps such as are located in most urban neighborhoods. The filter apparatus may also be used for industrial applications that require filtering polluted water or other fluids.

Figure 1:
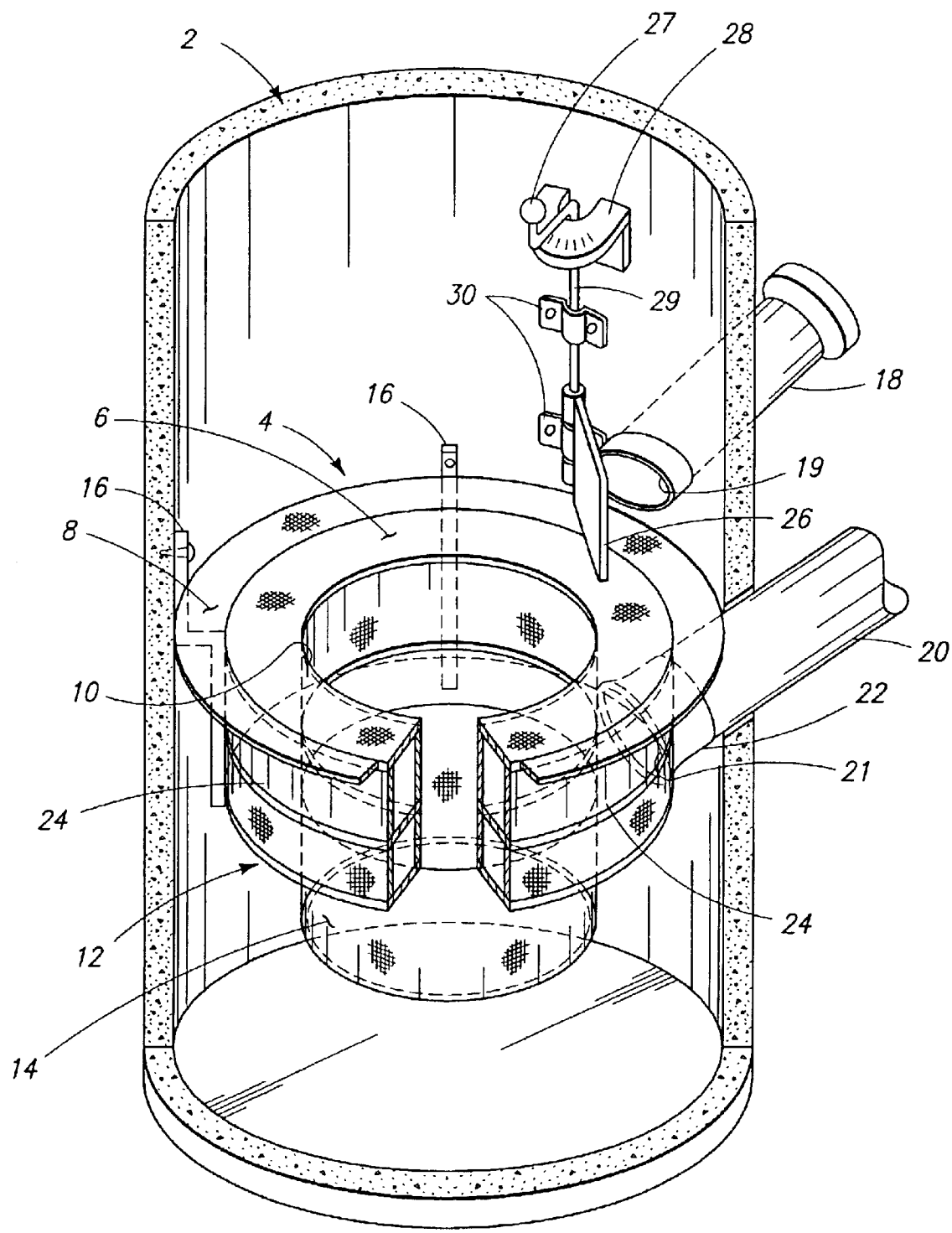
FIG. 1 is a perspective view of a preferred embodiment of a fluid filter apparatus according to the present invention, particularly showing the apparatus installed in a storm drain holding sump, which is cut away for illustration.

Referring particularly to the drawings, there is shown in FIG. 1 a perspective view of a preferred embodiment of a fluid filter apparatus 4 according to the present invention, installed in a holding sump 2 which is partially cut away to reveal the filter apparatus 4. The apparatus comprises an annular shaped filter channel 6, which is formed and enclosed by stacked apart, rigid perforated annular discs surrounded by sheets of stiff non-directional screening; an annular, screen rim member 8, which is attached to the top periphery of the filter channel 6, forming an outwardly projecting rim ; a cylindrical stainless steel screen baffle 14, that is attached to the bottom surface of the filter channel 6 so that the baffle 14 hangs concentrically below the channel; and a means for adjusting inlet fluid velocity that is fastened to the inside wall surface of the holding sump 2, adjacent to the inlet opening 19.

The filter channel 6 forms a continuous circle and has preferably, a rectangular shape cross-section as shown in FIG. 1 at a removed portion that is cut away for illustrative purposes. The channel structure is formed by three annular, identically sized and rigid, stainless steel disc members that each include a central, circular cut-out portion. The disc members are stacked concentrically, with the bottom disc member 12 being located a distance of approximately twice the channel width, below the top disc member. The center disc member 24 is located approximately equidistant from the top and bottom disc members. A sheet of stainless steel non-directional screen is welded or otherwise attached to the outer and inner circumferential edges of the three disc members, so that the disc members act as horizontal stiffeners for the channel. A plurality of support straps 16, which are fastened vertically to the outer peripheral side of the channel and to the disc members, provide vertical stiffening for the channel as well as means of suspension.

Since both the top and bottom disc members of the channel are perforated for screening purposes, the available channel filter area consists of the top and bottom disc members and the channel peripheral sides, both the inner side 10 at the center and the outer surrounding wall. This filter channel configuration thus produces an approximately 150% increase in filter area, compared with the use of only one side of a cylindrical filter, as is the case for other presently known vortex filter units.

The filter channel 6 with its attached rim member 8 and baffle 14, are set vertically inside the holding sump 2, with the top surface of the channel located approximately at mid-depth down the holding sump 2, leaving plenty of space for an inlet velocity control means to be installed above the channel and storage volume for fluid. A small space remaining between the peripheral edge of the filter apparatus and the sump wall is used by a plurality of supporting members 16 which are fastened to the filter channel 6 peripheral side and to the sump wall.

The holding sump 2 depicted includes an inlet end pipe 18 for storm water and an outlet end pipe 20 for the effluent filtered water. The outlet end pipe 20 is passed horizontally through a hole in the sump 2 wall, entering radially. It is then connected to an outlet transition 22 that is joined to the vertical, peripheral side of the filter channel 6, so that its' outlet opening 21 is directly inside the channel walls. At this location, immediately opposite the outlet opening 21, an atrium space is formed by cutting away part of the central channel disc member 24. This atrium facilitates smooth outlet flow for the filtered fluid in the channel.

The inlet end pipe 18 enters horizontally through another hole in the sump wall, at a small angle to a tangent to the circle described by a sump 2 horizontal cross-section. The hole in the sump wall is located so that the fluid inlet opening 19 projects into the sump only a short distance from the sump wall, and immediately above the top surface of the mounted filter channel 6 and attached annular rim member 8. This near tangential introduction of storm water or other fluid just above the filter channel 6, is done particularly to induce a vortex fluid flow pattern that is known to enhance the filtering action of the mounted filters. The vortex flow pattern is aided by the provision of an adjustable position, flow control vane 26 which is mounted immediately in front of the fluid inlet 19, and pivoted at one end at a set angle to the inlet 19 opening. Adjusting the set angle of the vane 26 affects the velocity of the incoming fluid stream which impinges on the filter channel 6, and thus influences the filtering action. In particular, the vane 26 angular position can be used to vary and increase vortex strength to assist in concentration of fluid-contained particles at the center of the unit, away from the filter channel. These particles will then travel by vortex flow, through the center opening formed by the filter channel 6, and down through the baffle 14 to the bottom of the sump 2, where they can accumulate until sucked out by sump cleaning equipment. The filtered water or other fluid, travels inside around the circular filter channel 6 and exits the channel 6 through an opening 21 in an attached transition pipe 22 and into the outlet end pipe 20.

Manual adjustment of the flow control vane 26 is effected by rotation of a handle 27 around the top surface of an angle supporting plate 28 which is located above the inlet opening, near the top service entry to the holding sump 2.

The handle 27 is connected by a vertical metal rod 29 to a hinged end of the vane 26, and the rod and vane is fastened by metal hinge strips 30 to the wall of the sump. For determining the vane angular position, the supporting angle plate 28, which is fastened to the sump wall, includes vane angle points indicated on its top surface. A means for locking the handle 27 at any selected vane angle point is also included.

Since the handle 27 for adjusting the control vane 26 angular position is located near the top service opening of the holding sump, it is easily accessed for inlet velocity adjustment when needed. Furthermore, the inlet flow constriction area effected by the control vane 26, is visible from the sump service opening; making any inlet constriction blockage visible and easily cleaned.

This ease in access and the visibility of a potential trouble area, contrasts with the problems inherent in presently available storm drain filters, which often have inlet constrictions located in a buried and difficult in to access connector pipe.

Regarding the rectangular cross-section structure of the filter channel 6, described earlier, it should be noted that this cross-section shape is preferred because it is considered the optimum shape for a high flow rate water filter, as would be required for use in a storm drain sump.

However, a rectangular cross-section shaped filter channel is not mandatory for the filter apparatus to work well under all conditions of fluid flow. For some possible smaller flow rate applications, a semi-oval or oval cross-section channel shape might be closer to optimum, and could be used. This shape is easily approximated by simply making the channel center disc member 24 larger in diameter than the top and bottom disc members. The basic operation mode and advantages of the invention filter apparatus will not have been changed.

Refer now to FIGS. 2, 3, 4A and 4B which are respectively, a top view of the filter apparatus, a cross-section view taken along line 3—3 of FIG. 2, a cross-section view of the fluid outlet area and a partial side view, looking into the outlet transition member 22. In FIG. 2, several filter aspects are shown which could not be clearly shown in the FIG. 1 drawing. The inlet end pipe 18 enters the sump wall at an angle to a tangent with the circle described by the top of the filter channel. This angle is set at about 25 deg. in order to start a desired vortex flow pattern. The outlet end pipe 20 on the other hand, enters the sump radially and is joined to an outlet transition member 22 which in turn, is joined to and enters the side of the filter channel 6.

A portion of the top of the channel 6 and surrounding filter member 8, has been cut away in FIG. 2 to show an atrium 17 that was created by removing part of the center disc member 24 opposite the outlet opening 21. This atrium 17 creation method is also shown in the cross-section view of FIG. 4A. The atrium 17 is included to assist the outlet flow of the filtered water flowing in the filter channel 6.

In the cross-section view of FIG. 3, the channel 6 outer filter sheet member 7 and inner filter sheet member 10 are shown joined to the ends of the three horizontal disc members. The baffle 14 is joined to an under side 9 of the bottom disc member 12, in line with the inner filter sheet member 10 above it. In this configuration, the hanging baffle 14 moves sinking litter to the bottom of the sump 2 and thus protects the bottom surface and outer filter sheet member 7 which surround the filter channel 6 from clogging.

FIGS. 4A and 4B show views of the portion of the filter channel 6 to which an outlet transition connection 22 is attached. The transition connection 22 facilitates connection of an outlet end pipe 20 to the channel through the end pipe opening 25 as shown in FIG. 2.

A side elevation view of the atrium 17 space formed by the removal of part of the center disc member 24 opposite the outlet transition 22, shows how the atrium 17 space directs the filtered fluid flowing in both the upper and lower portions of the filter channel, directly into the outlet.

Figure 5:
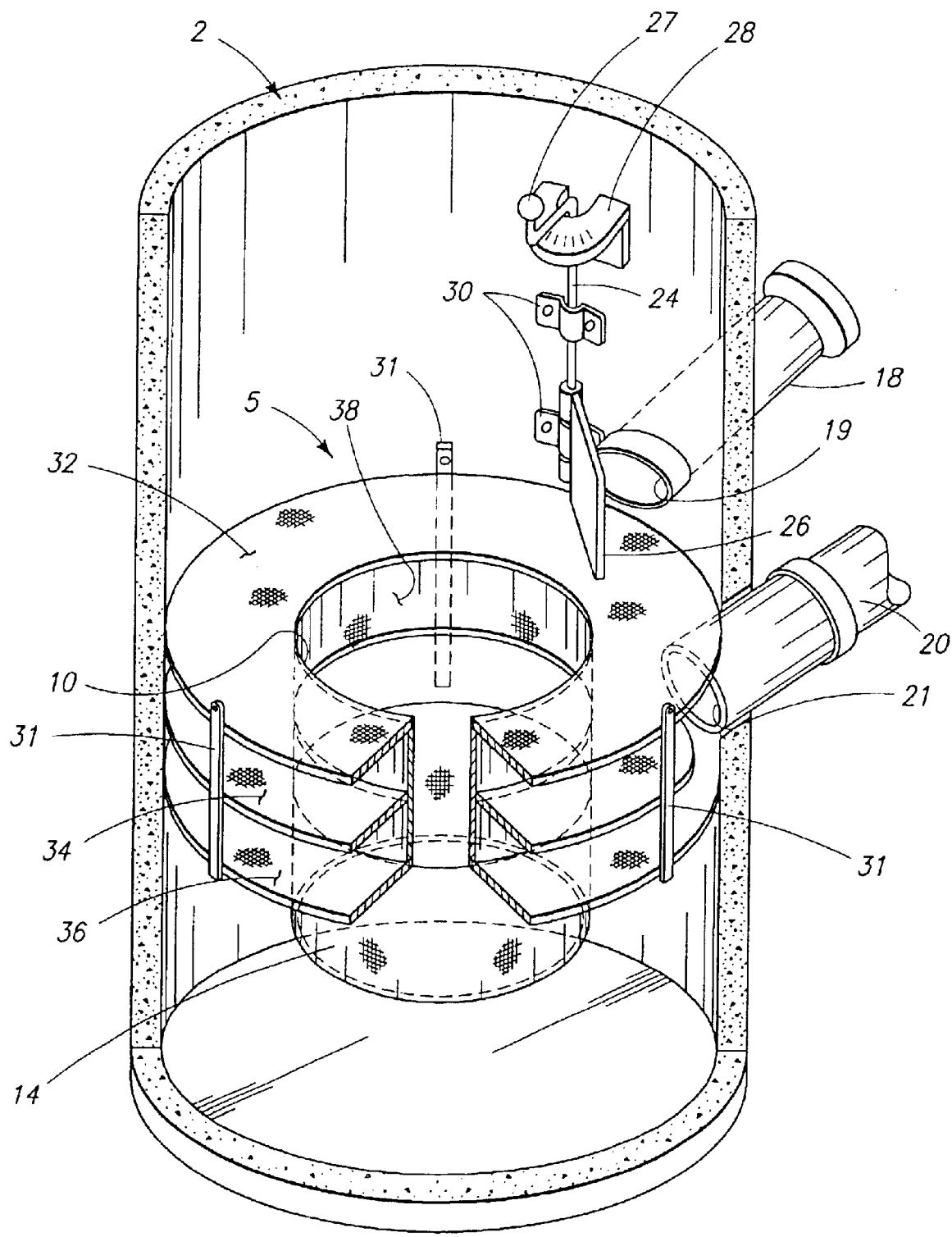
FIG. 5 is a perspective view of an alternate embodiment of a fluid filter apparatus according to the present invention, particularly showing the apparatus installed in a storm drain holding sump, which is cut away for illustration.

An alternate embodiment of the present invention fluid filter apparatus is shown in FIG. 5, installed in a holding sump 2 which is cut-away to display the filter apparatus.

Except for the circular filter channel 5 and its supporting straps 31, the alternate filter apparatus, including the inlet flow velocity control means, is identical to that shown and described in FIG. 1 for the preferred embodiment. The inlet end pipe 18 and the outlet end pipe 20, enter through holes cut in the wall of the sump 2 at the same angles and locations as shown and described for the preferred embodiment.

The filter channel 5 is open on one side and is comprised of three stainless steel, rigid, circular disc members, 32, 34, 36; a stainless steel screen filter sheet member 10 that is attached to the disc members, and a plurality of metal support straps 31. The disc members are perforated for screening and are identical. In each disc member, a circular cut-out portion which is concentric with the outer diameter, provides an edge for attachment of the filter sheet member 10 to the inner circular side 38 of the channel forming a screen wall. The outer side of the channel is left open.

As shown in FIG. 5, each disc member diameter is sized to fit horizontally inside the sump wall, with clearance just sufficient to accommodate the support straps 31 which fasten to the peripheral edge of each disc member and to the sump wall.

For fabrication, the disc members are stacked apart with the center disc member 34 placed equidistant from the top and bottom disc members 32, 36, at a separation distance between disc members of at least 50 percent of the peripheral surface width of each disc member. Thus, a channel cross-section area may be square or rectangular in shape. The screen filter sheet member 10 is then joined to the disc members, forming a circular channel to transport filtered fluid, and a vertical axial opening 38 for passing through unfiltered fluid and impurities.

No screen member is required to fit around the channel outer periphery; the sump wall surface provides effective closure for all except filtered fluid. Since the disc members leave so little space between their peripheral edge and the sump wall, few inflowing liquid impurities can enter near the sump wall.

A screened baffle 14 is attached concentrically to the underneath surface of the bottom disc member 36; hanging below the filter channel and moving sinking litter to the bottom of the sump.

In this alternate embodiment, there is no apparent need for an outlet transition pipe member to be attached to the side of the filter channel 5. This is because there is no barrier between the outlet pipe opening 21 and the open side of the channel, and the filtered fluid flows directly into the outlet pipe opening 21. However, if deemed necessary for a particular application, a small area of the center disc member 34 directly opposite the outlet pipe opening 21, may be cut out to improve exit flow.

The invention filter apparatus as described above has at least the following advantages over presently available filter apparatus:

1. For any given rating of flow treatment capacity, the invention filter apparatus provides an approximate 150% increase in filter area compared with other vortex units.
2. The location of the filter channel at a mid-depth in a holding sump, allows increased storage area above and below the filter. This allows approximately 50% to 200% greater storage capacity and less concentration of litter next to a filter screen vs. other filter vortex units.
3. The inlet flow velocity is easily manually adjustable, as compared to other filter units which may not include means for adjusting inlet flow velocity.
4. The invention adjustable inlet velocity control vane places inlet restriction within the sump where any blockages are visible and easily cleaned. This is an advantage over presently available filter units, which often have inlet constrictions in a buried and difficult to access connector pipe.

Both the preferred and alternate embodiments of the filter apparatus may be sized and scaled to fit a fluid treatment capacity of from 3 cfs to as much as 300 cfs.

From the foregoing description, it is believed that the described preferred and alternate embodiments achieve the objects of the present invention. Alternative embodiments and modifications will be apparent to those skilled in the art. These and other modifications are considered to be equivalent and within the spirit and scope of the present invention.

Having described the invention, what is claimed is:

1. In a vertical holding sump, said sump having a tubular shape enclosed by a peripheral side wall and a bottom end wall, and including a circular service opening at a top end; said side wall including a first hole with an inlet end pipe inserted therein so that an inlet opening projects a little way into said sump, said side wall also including a second hole that is sized for receiving an outlet end pipe which has an outlet opening that projects into said sump; said first hole being located at about a third of sump depth down from said service opening, and said inlet end pipe being inserted in said first hole at a lateral plane angle of about 25 degrees to a tangent line that contacts a circle described by the sump side wall; said second hole being located at approximately mid-depth of said sump;

a fluid filter apparatus comprising:

(a) an enclosed, circular, filter channel comprising:

a top disc member which is rigid, annular in shape and made from perforated stainless steel sheet;

a center disc member which is identical to said top disc member in size, shape and material, and includes a cut-out portion in the peripheral surface of said center disc member;

a bottom disc member which is identical to said top disc member;

a first filter sheet member, having a rectangular elongated shape and made of stainless-steel non-directional screen;

a second filter sheet member, having a rectangular elongated shape and made of stainless steel non-directional screen, including a screen opening located centrally; and an outlet transition pipe member;

said top disc member, center disc member and bottom disc member being concentric, and each vertically spaced apart an amount equal to at least the width of the peripheral surface of said top disc member; said first filter sheet member fastened to an inner peripheral surface edge of each disc member, forming a vertical cylindrical screen wall at the center of said filter channel; said second filter sheet fastened to an outer peripheral surface edge of each disc member, forming a second vertical cylindrical screen wall surrounding said filter channel; said second filter sheet fastened so that said screen opening is located immediately opposite said cut-out portion in said center disc member; said outlet transition pipe member fastened to said second filter sheet around said screen opening;

(b) an annular rim member that is fastened normal to said second vertical screen wall surrounding said filter channel, at a point abutting an outer peripheral edge of said top disc member; forming an outward extending rim; said rim member made of rigid, flat stainless steel non-directional screen, said rim member having a center opening diameter sized to fit closely over said top disc member, and having an outer diameter sized to fit horizontally in said sump with little clearance;

(c) a cylindrical baffle made of stainless steel non-directional screen sheet; said baffle hanging concentrically under said filter channel, fastened to said bottom disc member;

(d) a plurality of metal support straps which are fastened vertically to said second vertical screen wall around said filter channel, and also fastened to the disc members for stiffening purposes; said straps each including a hole near a top end for a fastening bolt; and (e) first means for adjusting inlet fluid velocity; said first means located inside said sump, adjacent to said inlet opening;

said filter channel and appendages being supported inside said sump by said straps which are bolted to said side wall of the sump, with said top disc member located a little below said inlet opening, so that inlet fluid will impinge directly on top of said filter channel; said filter channel rotated, with said outlet transition pipe member being situated in line with said second hole in said sump for connection to an outlet end pipe.

2. The filter apparatus according to claim 1 wherein said first means for adjusting inlet fluid velocity, includes a rectangular vane that is attached at one end to a hinge, with said hinge, vertically placed on said side wall and fastened adjacent to said inlet opening, so that said vane may cover or be rotated away from said inlet opening; an elongated metal rod, that is connected at one end to said vane at said hinge, and connected at a distal end to a handle; a metal angle that is fastened to said side wall above said hinge, said angle having a plate which extends horizontally from said side wall and includes an opening through which said rod is inserted and rotatably secured, said handle remaining above said plate; said plate including markings indicating set vane opening angle with respect to the plane of said inlet opening; and second means for removably connecting said handle to said plate at a selected vane opening angle marking.

3. The filter apparatus according to claim 1 wherein said center disc member has a greater peripheral surface width than said top disc member and said bottom disc member.

4. In a vertical holding sump, said sump having a tubular shape enclosed by a peripheral side wall and a bottom end wall, and including a circular service opening at a top end; said side wall including a first hole with an inlet end pipe inserted therein so that an inlet opening projects a little way into said sump, said side wall also including a second hole that is sized for receiving an outlet end pipe which has an outlet opening that projects into said sump; said first hole being located at about a third of sump depth down from said service opening, and said inlet end pipe being inserted in said first hole at a lateral plane angle of about 25 degrees to a tangent line that contacts a circle described by the sump side wall; said second hole being located at approximately mid-depth of said sump;

a fluid filter apparatus comprising:

(a) a partly enclosed, circular, filter channel comprising:

a top disc member which is rigid, annular in shape and made from perforated stainless steel sheet; said top disc member having an outer diameter which is sized to fit horizontally in said sump with clearance for support straps;

a center disc member which is identical to said top disc member in size, shape and material, and includes a cut-out portion in the peripheral surface of said center disc member;

a bottom disc member which is identical to said top disc member; and a first filter sheet member, having a rectangular elongated shape and made of stainless-steel non-directional screen;

said top disc member, center disc member and bottom disc member being concentric, and each vertically spaced apart an amount equal to 50 percent or more of the width of the peripheral surface of each disc member; said first filter sheet member fastened to an inner peripheral surface edge of each disc member, forming a vertical cylindrical screen wall at the center of said filter channel;

(b) a cylindrical baffle made of stainless steel non-directional screen sheet; said baffle hanging concentrically under said filter channel, fastened to said bottom disc member;

(c) a plurality of metal support straps which are fastened vertically to outer peripheral edges of said disc members for stiffening purposes; said straps each including a hole near a top end for a fastening bolt; and (d) first means for adjusting inlet fluid velocity; said first means located inside said sump, adjacent to said inlet opening;

said filter channel and appended baffle being supported inside said sump by said straps which are bolted to said side wall of the sump, with said top disc member located a little below said inlet opening, so that inlet fluid will impinge directly on top of said filter channel; said filter channel rotated, with said cut-out portion in said center disc member being situated in line with said second hole in said sump in which an outlet end pipe is inserted.

5. The filter apparatus according to claim 4 wherein said first means, includes a rectangular vane that is attached at one end to a hinge, with said hinge, vertically placed on said side wall and fastened adjacent to said inlet opening, so that said vane may cover or be rotated away from said inlet opening; an elongated metal rod, that is connected at one end to said vane at said hinge, and connected at a distal end to a handle; a metal angle that is fastened to said side wall above said hinge, said angle having a plate which extends horizontally from said side wall and includes an opening through which said rod is inserted and rotatably secured, said handle remaining above said plate; said plate including markings indicating set vane opening angle with respect to the plane of said inlet opening; and second means for removably connecting said handle to said plate at a selected vane opening angle marking.

* * * * *